(12) United States Patent
Basavaraj et al.

(10) Patent No.: US 10,797,998 B2
(45) Date of Patent: Oct. 6, 2020

(54) ROUTE SERVER FOR DISTRIBUTED ROUTERS USING HIERARCHICAL ROUTING PROTOCOL

(71) Applicant: VMware, Inc., Palo Alto, CA (US)

(72) Inventors: Vijayalaxmi Basavaraj, Cupertino, CA (US); Ankur Dubey, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 21 days.

(21) Appl. No.: 16/210,410

(22) Filed: Dec. 5, 2018

(65) Prior Publication Data

US 2020/0186468 A1 Jun. 11, 2020

(51) Int. Cl.
*H04L 12/741* (2013.01)
*H04L 12/715* (2013.01)
*H04L 12/733* (2013.01)
*H04L 12/721* (2013.01)
*H04L 12/717* (2013.01)

(52) U.S. Cl.
CPC ............ *H04L 45/745* (2013.01); *H04L 45/04* (2013.01); *H04L 45/122* (2013.01); *H04L 45/124* (2013.01); *H04L 45/42* (2013.01)

(58) Field of Classification Search
CPC ... H04L 45/745; H04L 45/122; H04L 45/124; H04L 45/04; H04L 45/42
See application file for complete search history.

(56) References Cited

U.S. PATENT DOCUMENTS 5,504,921 A 4/1996 Dev et al.
5,550,816 A 8/1996 Hardwick et al.
(Continued)

FOREIGN PATENT DOCUMENTS

CN 1442987 A 9/2003
CN 1714548 A 12/2005
(Continued)

OTHER PUBLICATIONS

Agarwal, Sugam, et al., "Traffic Engineering in Software Defined Networks," 2013 Proceedings IEEE INFOCOM, Apr. 14, 2013, 10 pages, Bell Labs, Alcatel-Lucent, Holmdel, NJ, USA.
(Continued)

*Primary Examiner* — Mohammad S Anwar
(74) *Attorney, Agent, or Firm* — Adeli LLP (57) ABSTRACT

Some embodiments provide a method for a computing device that implements a centralized logical routing component of a logical network that handles data traffic between the logical network and an external physical network. The method receives a first routing protocol message from a machine that implements a route server for a distributed logical routing component of the logical network. The first routing protocol message includes (i) a parameter identifying the machine as a route server and (ii) a set of logical network addresses. The method receives a second routing protocol message from the route server that specifies a next hop address for the set of logical network addresses. The method adds a route specifying the next hop address for the set of logical network addresses to a routing table of the centralized logical routing component. The added route has a higher priority than routes received from the external physical network.

20 Claims, 7 Drawing Sheets

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,914,907 B1 | 7/2005 | Bhardwaj et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,447,197 B2 | 11/2008 | Terrell et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,630,358 B1 | 12/2009 | Lakhani et al. |
| 7,643,488 B2 | 1/2010 | Khanna et al. |
| 7,649,851 B2 | 1/2010 | Takashige et al. |
| 7,653,747 B2 | 1/2010 | Lucco et al. |
| 7,710,874 B2 | 5/2010 | Balakrishnan et al. |
| 7,742,459 B2 | 6/2010 | Kwan et al. |
| 7,764,599 B2 | 7/2010 | Doi et al. |
| 7,778,268 B2 | 8/2010 | Khan et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,260 B2 | 9/2011 | Venugopal et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,416,709 B1 | 4/2013 | Marshall et al. |
| 8,456,984 B2 | 6/2013 | Ranganathan et al. |
| 8,504,718 B2 | 8/2013 | Wang et al. |
| 8,559,324 B1 | 10/2013 | Brandwine et al. |
| 8,565,108 B1 | 10/2013 | Marshall et al. |
| 8,600,908 B2 | 12/2013 | Lin et al. |
| 8,611,351 B2 | 12/2013 | Gooch et al. |
| 8,612,627 B1 | 12/2013 | Brandwine |
| 8,625,594 B2 | 1/2014 | Sakai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,958,298 B2 | 2/2015 | Zhang et al. |
| 9,021,066 B1 | 4/2015 | Singh et al. |
| 9,032,095 B1 | 5/2015 | Traina et al. |
| 9,059,999 B2 | 6/2015 | Koponen et al. |
| 9,137,052 B2 | 9/2015 | Koponen et al. |
| 9,313,129 B2 | 4/2016 | Ganichev et al. |
| 9,419,855 B2 | 8/2016 | Ganichev et al. |
| 9,485,149 B1 | 11/2016 | Traina et al. |
| 9,503,321 B2 | 11/2016 | Neginhal et al. |
| 9,559,980 B2 | 1/2017 | Li et al. |
| 9,647,883 B2 | 5/2017 | Neginhal et al. |
| 9,749,214 B2 | 8/2017 | Han |
| 9,787,605 B2 | 10/2017 | Zhang et al. |
| 10,057,157 B2 | 8/2018 | Goliya et al. |
| 10,075,363 B2 | 9/2018 | Goliya et al. |
| 10,079,779 B2 | 9/2018 | Zhang et al. |
| 10,095,535 B2 | 10/2018 | Dubey et al. |
| 10,110,431 B2 | 10/2018 | Ganichev et al. |
| 10,129,142 B2 | 11/2018 | Goliya et al. |
| 10,129,180 B2 | 11/2018 | Zhang et al. |
| 10,153,973 B2 | 12/2018 | Dubey |
| 10,230,629 B2 | 3/2019 | Masurekar et al. |
| 10,341,236 B2 | 7/2019 | Boutros et al. |
| 10,382,321 B1 * | 8/2019 | Boyapati ................. H04L 45/02 |
| 10,411,955 B2 | 9/2019 | Neginhal et al. |
| 10,454,758 B2 | 10/2019 | Boutros et al. |
| 10,601,700 B2 | 3/2020 | Goliya et al. |
| 2001/0043614 A1 | 11/2001 | Viswanadham et al. |
| 2002/0067725 A1 | 6/2002 | Oguchi et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0067924 A1 | 4/2003 | Choe et al. |
| 2003/0069972 A1 | 4/2003 | Yoshimura et al. |
| 2004/0013120 A1 | 1/2004 | Shen |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0059253 A1 | 3/2006 | Goodman et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291387 A1 | 12/2006 | Kimura et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |

(56) References Cited

U.S. PATENT DOCUMENTS

| | | |
|---|---|---|
| 2007/0165515 A1* | 7/2007 | Vasseur .................. H04L 12/66 370/216 |
| 2007/0201357 A1 | 8/2007 | Smethurst et al. |
| 2007/0206591 A1 | 9/2007 | Doviak et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0253396 A1 | 10/2008 | Olderdissen |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0064305 A1 | 3/2009 | Stiekes et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0149964 A1 | 6/2011 | Judge et al. |
| 2011/0149965 A1 | 6/2011 | Judge et al. |
| 2011/0194567 A1 | 8/2011 | Shen |
| 2011/0205931 A1 | 8/2011 | Zhou et al. |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0131643 A1 | 5/2012 | Cheriton |
| 2012/0155467 A1 | 6/2012 | Appenzeller |
| 2012/0182992 A1 | 7/2012 | Cowart et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0058225 A1 | 3/2013 | Casado et al. |
| 2013/0058229 A1 | 3/2013 | Casado et al. |
| 2013/0058335 A1 | 3/2013 | Koponen et al. |
| 2013/0058350 A1 | 3/2013 | Fulton |
| 2013/0058353 A1 | 3/2013 | Koponen et al. |
| 2013/0060940 A1 | 3/2013 | Koponen et al. |
| 2013/0094350 A1 | 4/2013 | Mandal et al. |
| 2013/0103817 A1 | 4/2013 | Koponen et al. |
| 2013/0103818 A1 | 4/2013 | Koponen et al. |
| 2013/0132536 A1 | 5/2013 | Zhang et al. |
| 2013/0142048 A1 | 6/2013 | Gross, IV et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0208621 A1 | 8/2013 | Manghirmalani et al. |
| 2013/0212148 A1 | 8/2013 | Koponen et al. |
| 2013/0223444 A1 | 8/2013 | Liljenstolpe et al. |
| 2013/0230047 A1 | 9/2013 | Subrahmaniam et al. |
| 2013/0266007 A1 | 10/2013 | Kumbhare et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0059226 A1 | 2/2014 | Messerli et al. |
| 2014/0146817 A1 | 5/2014 | Zhang |
| 2014/0173093 A1 | 6/2014 | Rabeela et al. |
| 2014/0195666 A1 | 7/2014 | Dumitriu et al. |
| 2014/0229945 A1 | 8/2014 | Barkai et al. |
| 2014/0241247 A1 | 8/2014 | Kempf et al. |
| 2014/0269299 A1 | 9/2014 | Koornstra |
| 2014/0328350 A1 | 11/2014 | Hao et al. |
| 2014/0372582 A1 | 12/2014 | Ghanwani et al. |
| 2014/0376550 A1 | 12/2014 | Khan et al. |
| 2015/0016300 A1 | 1/2015 | Devireddy et al. |
| 2015/0063360 A1 | 3/2015 | Thakkar et al. |
| 2015/0063364 A1 | 3/2015 | Thakkar et al. |
| 2015/0089082 A1 | 3/2015 | Patwardhan et al. |
| 2015/0092594 A1* | 4/2015 | Zhang .................. H04L 45/12 370/254 |
| 2015/0103838 A1 | 4/2015 | Zhang et al. |
| 2015/0188770 A1 | 7/2015 | Naiksatam et al. |
| 2015/0222550 A1 | 8/2015 | Anand |
| 2015/0263897 A1 | 9/2015 | Ganichev et al. |
| 2015/0263946 A1* | 9/2015 | Tubaltsev ............. H04L 45/586 370/392 |
| 2015/0263952 A1 | 9/2015 | Ganichev et al. |
| 2015/0271011 A1 | 9/2015 | Neginhal et al. |
| 2015/0271303 A1 | 9/2015 | Neginhal et al. |
| 2015/0299880 A1 | 10/2015 | Jorge et al. |
| 2016/0105471 A1 | 4/2016 | Nunes et al. |
| 2016/0119229 A1 | 4/2016 | Zhou |
| 2016/0182287 A1 | 6/2016 | Chiba et al. |
| 2016/0191374 A1 | 6/2016 | Singh et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0261493 A1 | 9/2016 | Li |
| 2016/0294612 A1 | 10/2016 | Ravinoothala et al. |
| 2016/0344586 A1 | 11/2016 | Ganichev et al. |
| 2017/0005923 A1 | 1/2017 | Babakian |
| 2017/0048129 A1 | 2/2017 | Masurekar et al. |
| 2017/0048130 A1 | 2/2017 | Goliya et al. |

(56) References Cited

U.S. PATENT DOCUMENTS

| | | | |
|---|---|---|---|
| 2017/0063632 A1 | 3/2017 | Goliya et al. |
| 2017/0063633 A1 | 3/2017 | Goliya et al. |
| 2017/0064717 A1 | 3/2017 | Filsfils et al. |
| 2017/0126497 A1 | 5/2017 | Dubey et al. |
| 2017/0180154 A1 | 6/2017 | Duong et al. |
| 2017/0230241 A1 | 8/2017 | Neginhal et al. |
| 2017/0317919 A1 | 11/2017 | Fernando et al. |
| 2018/0006943 A1 | 1/2018 | Dubey |
| 2018/0062914 A1 | 3/2018 | Boutros et al. |
| 2018/0097734 A1 | 4/2018 | Boutros et al. |
| 2018/0367442 A1 | 12/2018 | Goliya et al. |
| 2019/0018701 A1 | 1/2019 | Dubey et al. |
| 2019/0020580 A1 | 1/2019 | Boutros et al. |
| 2019/0020600 A1 | 1/2019 | Zhang et al. |
| 2019/0109780 A1 | 4/2019 | Nagarkar |
| 2019/0124004 A1 | 4/2019 | Dubey |
| 2019/0199625 A1 | 6/2019 | Masurekar et al. |
| 2019/0281133 A1 | 9/2019 | Tomkins |
| 2019/0312812 A1 | 10/2019 | Boutros et al. |
| 2019/0334767 A1 | 10/2019 | Neginhal et al. |
| 2020/0021483 A1 | 1/2020 | Boutros et al. |
| 2020/0169496 A1 | 5/2020 | Goliya et al. |

FOREIGN PATENT DOCUMENTS

| | | |
|---|---|---|
| CN | 103890751 A | 6/2014 |
| CN | 103947164 A | 7/2014 |
| CN | 104335553 A | 2/2015 |
| EP | 1653688 A1 | 5/2006 |
| EP | 2838244 A2 | 2/2015 |
| EP | 3013006 A1 | 4/2016 |
| JP | 2000244567 A | 9/2000 |
| JP | 2003069609 A | 3/2003 |
| JP | 2003124976 A | 4/2003 |
| JP | 2003318949 A | 11/2003 |
| JP | 2011139299 A | 7/2011 |
| JP | 2011228864 A | 11/2011 |
| JP | 2014534789 A | 12/2014 |
| KR | 1020110099579 A | 9/2011 |
| WO | 2005112390 A1 | 11/2005 |
| WO | 2008095010 A1 | 8/2008 |
| WO | 2013020126 A1 | 2/2013 |
| WO | 2013026049 A1 | 2/2013 |
| WO | 2013055697 A1 | 4/2013 |
| WO | 2013081962 A1 | 6/2013 |
| WO | 2013143611 A1 | 10/2013 |
| WO | 2013184846 A1 | 12/2013 |
| WO | 2015015787 A1 | 2/2015 |
| WO | 2015142404 A1 | 9/2015 |
| WO | 2016123550 A1 | 8/2016 |
| WO | 2017027073 A1 | 2/2017 |
| WO | 2018044746 A1 | 3/2018 |

OTHER PUBLICATIONS

Aggarwal, R., et al., "Data Center Mobility based on E-VPN, BGP/MPLS IP VPN, IP Routing and NHRP," draft-raggarwa-data-center-mobility-05.txt, Jun. 10, 2013, 24 pages, Internet Engineering Task Force, IETF, Geneva, Switzerland.

Author Unknown, "VMware® NSX Network Virtualization Design Guide," Month Unknown 2013, 32 pages, Item No. VMW-NSX-NTWK-VIRT-DESN-GUIDE-V2-101, VMware, Inc., Palo Alto, CA, USA.

Ballani, Hitesh, et al., "Making Routers Last Longer with ViAggre," NSDI '09: 6th USENIX Symposium on Networked Systems Design and Implementation, Apr. 2009, 14 pages, USENIX Association.

Berger, L, et al, "The OSPF Opaque LSA Option," Jul. 2008, 17 pages, RFC 5250, IETF.

Caesar, Matthew, et al., "Design and Implementation of a Routing Control Platform," NSDI '05: 2nd Symposium on Networked Systems Design & Implementation , Apr. 2005, 14 pages, USENIX Association.

Dumitriu, Dan Mihai, et al., (U.S. Appl. No. 61/514,990), filed Aug. 4, 2011.

Fernando, Rex, et al., "Service Chaining using Virtual Networks with BGP," Internet Engineering Task Force, IETF, Jul. 7, 2015, 32 pages, Internet Society (ISOC), Geneva, Switzerland, available at https://tools.ietf.org/html/draft-fm-bess-service-chaining-01.

Handley, Mark, et al., "Designing Extensible IP Router Software," Proc. of NSDI, May 2005, 14 pages.

Keller, Ralph, "Dissemination of Application-Specific Information using the OSPF Routing Protocol," TIK Report Nr. 181, Nov. 2003, 12 pages, ETH Zurich, Switzerland.

Koponen, Teemu, et al., "Network Virtualization in Multi-tenant Datacenters," Technical Report TR-2013-001E, Aug. 2013, 22 pages, VMware, Inc., Palo Alto, CA, USA.

Lakshminarayanan, Karthik, et al., "Routing as a Service," Report No. UCB/CSD-04-1327, Month Unknown 2004, 16 pages, Computer Science Division (EECS), University of California—Berkeley, Berkeley, California.

Lowe, Scott, "Learning NSX, Part 14: Using Logical Routing," Scott's Weblog: The weblog of an IT pro specializing in cloud computing, virtualization, and networking, all with an open source view, Jun. 20, 2014, 8 pages, available at https://blog.scottlowe.org/2014/06/20/learning-nsx-part-14-using-logical-routing/.

Maltz, David A., et al., "Routing Design in Operational Networks: A Look from the Inside," SIGCOMM '04, Aug. 30-Sep. 3, 2004, 14 pages, ACM, Portland, Oregon, USA.

Non-Published Commonly Owned U.S. Appl. No. 16/216,936, filed Dec. 11, 2018, 47 pages, Nicira, Inc.

Rosen, E, "Applicability Statement for BGP/MPLS IP Virtual Private Networks (VPNs)," RFC 4365, Feb. 2006, 32 pages, The Internet Society.

Sajassi, Ali, et al., "Integrated Routing and Bridging in EVPN draft-sajassi-l2vpn-evpn-inter-subnet-forwarding-04", Jul. 4, 2014, 24 pages.

Shenker, Scott, et al., "The Future of Networking, and the Past of Protocols," Dec. 2, 2011, 30 pages, USA.

Wang, Anjing, et al., "Network Virtualization: Technologies, Perspectives, and Frontiers," Journal of Lightwave Technology, Feb. 15, 2013, 15 pages, IEEE.

Wang, Yi, et al., "Virtual Routers on the Move: Live Router Migration as a Network-Management Primitive," SIGCOMM '08, Aug. 17-22, 2008, 12 pages, ACM, Seattle, Washington, USA.

Non-Published commonly Owned U.S. Appl. No. 16/441,939, filed Jun. 20, 2019, 37 pages, Nicira, Inc.

Non-Published commonly Owned U.S. Appl. No. 16/506,182, filed Jul. 9, 2019, 91 pages, Nicira, Inc.

Author Unknown, "Cisco Border Gateway Protocol Control Plane for Virtual Extensible LAN," White Paper, Jan. 23, 2015, 6 pages, Cisco Systems, Inc.

Author Unknown, "Cisco Data Center Spine-and-Leaf Architecture: Design Overview," White Paper, Apr. 15, 2016, 27 pages, Cisco Systems, Inc.

Moreno, Victor, "VXLAN Deployment Models—A Practical Perspective," Cisco Live 2015 Melbourne, Mar. 6, 2015, 72 pages, BRKDCT-2404, Cisco Systems, Inc.

Non-published commonly owned U.S. Appl. No. 16/581,118, filed Sep. 24, 2019, 36 pages, Nicira, Inc.

Non-published commonly owned U.S. Appl. No. 16/823,050, filed Mar. 18, 2020, 79 pages, Nicira, Inc.

Non-published commonly owned U.S. Appl. No. 16/868,524, filed May 6, 2020, 105 pages, Nicira, Inc.

* cited by examiner

ROUTE SERVER FOR DISTRIBUTED ROUTERS USING HIERARCHICAL ROUTING PROTOCOL

BACKGROUND

Typical physical networks have several physical routers to perform L3 forwarding (i.e., routing). When a first machine wants to send a packet to a second machine located on a different IP subnet, the packet is sent to a router that uses a destination IP address of the packet to determine through which of its physical interfaces the packet should be sent. Larger networks will have multiple routers, such that if one of the routers fails, the packets can be routed along a different path between the first machine and the second machine.

In logical networks, user-defined data compute nodes (e.g., virtual machines) on different subnets may need to communicate with each other as well. In this case, tenants may define a network for virtualization that includes both logical switches and logical routers. In certain systems, the logical routers may include both distributed logical routers that are implemented across numerous physical forwarding elements and centralized logical routers that are implemented by single physical forwarding elements. Techniques for these logical routers to communicate with each other are desirable.

BRIEF SUMMARY

Some embodiments of the invention provide a method for implementing a route server for a distributed logical router (or a distributed routing component of a logical router) that uses a hierarchical routing protocol for routing data messages in a logical network. The logical router of some embodiments includes (i) a distributed routing component that is implemented by managed forwarding elements executing on multiple host computers and (ii) one or more centralized routing components that are each implemented on separate host computers at the edge of the logical network. These centralized routing components are responsible for handling data traffic between the logical network and external physical networks.

In order for the end machines in the logical network to receive data message traffic from the external network, the centralized routing component (also referred to as an edge gateway) of some embodiments learns routes from the distributed routing component, which logically interfaces more directly with the internal logical network. The edge gateways (i) advertise some of the routes from the distributed routing component to routers in the external network and (ii) use these routes to route data messages received from the external network.

The edge gateways also learn routes from the external network routers. In certain situations, the edge gateways will learn routes for a public Internet Protocol prefix from the external routers that is also used as an internal private subnet in the logical network (in which case the edge gateway would be configured to not advertise the route, but should use the route for internal routing). In certain cases, the hierarchy of the routing protocol will cause the edge gateway to prefer the route learned from the external router to that learned from the distributed routing component.

Because the distributed routing component is implemented across numerous (e.g., dozens, hundreds, thousands, etc.) of physical host computers, in some embodiments a route server is used to aggregate the routes of the distributed routing component and advertise these routes to the edge gateways. This route server may be implemented as a separate physical device, a virtual machine or other data compute node executing on a host computer (e.g., separately from data compute nodes that are the endpoints of the logical network), etc.

In order to ensure that the routes advertised by the distributing routing component route server are preferred by the edge gateway over routes received from the external router, in some embodiments the route server sends two types of routing protocol messages to the edge gateway. The first routing protocol message of some includes (i) a parameter that identifies the machine as a route server to the edge gateway and (ii) a set of addresses (prefixes) for the logical network (e.g., subnets of the logical network). These addresses are the addresses for which routes are advertised to the edge gateways.

The second routing protocol message specifies a next hop address corresponding to the distributed routing component (e.g., an interface of the distributed routing component that interfaces with the edge gateways), and the edge gateway uses this next hop address as the next hop for the set of addresses sent in the first message. Because the first message identifies the source of these routes as a route server, the edge gateways prefer these routes to routes learned from the external router when updating its routing table. Thus, for data messages addressed to the logical network endpoints, the edge gateway routing table will route the messages to the distributed routing component (which may be implemented by a different routing table on the same computing device). For data messages addressed to other addresses not in the logical network (e.g., external addresses), the edge gateway will still route the packets to the external routers.

One hierarchical routing protocol used in some embodiments is Open Shortest Path First (OSPF). In this case, the first routing protocol message is a type 1 Link State Advertisement (LSA), also known as a "router LSA." The router LSA includes an options field in the header, where the parameter that identifies the machine as a route server is a single bit in the options field. In some embodiments, the last bit in the options field is the route server bit. In such embodiments, the second routing protocol message is a type 9 LSA, also known as an "opaque LSA." The opaque LSA includes a header with an opaque type field, and also includes an opaque information field. The next hop address is specified in the opaque information field, and the opaque type field is set to a value that allows the edge gateway to recognize the opaque LSA.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Some embodiments of the invention provide a method for implementing a route server for a distributed logical router (or a distributed routing component of a logical router) that uses a hierarchical routing protocol for routing data messages in a logical network. The logical router of some embodiments includes (i) a distributed routing component that is implemented by managed forwarding elements executing on multiple host computers and (ii) one or more centralized routing components that are each implemented on separate host computers at the edge of the logical network. These centralized routing components are responsible for handling data traffic between the logical network and external physical networks.

Figure 1:
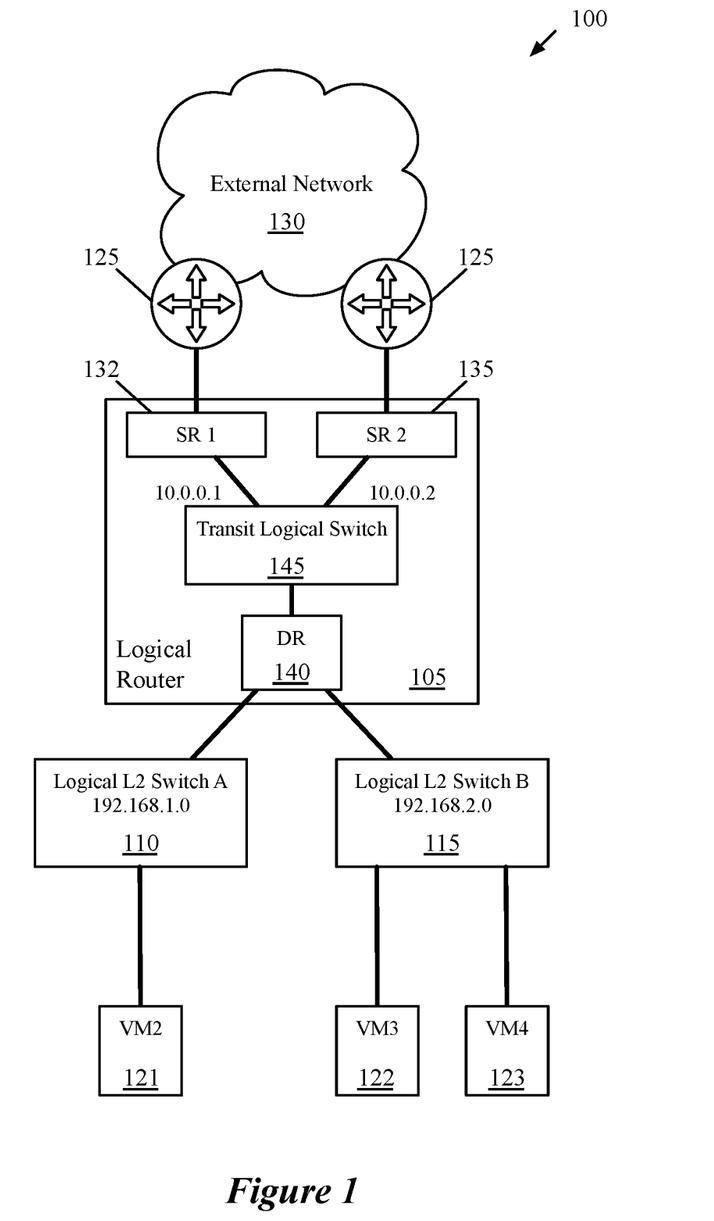
FIG. 1 conceptually illustrates a management/configuration view of a logical network as designed by a user.

FIG. 1 conceptually illustrates a management/configuration view of a logical network 100 of some embodiments. As shown, the logical router 105 is part of a logical network 100 that also includes two logical switches 110 and 115. In this example, each logical switch corresponds to a private subnet, with the first logical switch 110 having the subnet 192.168.1.0/24 and the second logical switch 115 having the subnet 192.168.2.0/24. Each of the logical switches 110 and 115 has a varying number of logical ports to which virtual machines (VMs) 121-123 connect. While shown as VMs in these figures, it should be understood that other types of data compute nodes (e.g., containers, physical servers, etc.) may connect to logical switches in some embodiments. The logical router 105 also connects to external routers 125 in an external physical network 130.

The network management and control system of some embodiments also defines additional components 132-145 within the logical router 105. These components include multiple centralized routing components (also referred to as service routers, or SRs) 132 and 135, a distributed routing component (DR) 140, and a transit logical switch 145. The distributed routing component 140 includes a south-facing interface for each of the logical switches 110 and 115, and a single north-facing interface to the transit logical switch 145 (used to communicate with the service routers 132 and 135). The service routers 132 and 135 each include a single south-facing interface to the transit logical switch 145 (used to communicate with the distributed routing component 140, as well as each other in certain situations). In addition, in some embodiments, additional logical routers (with distributed and/or centralized routing components of their own) can connect to the distributed routing component 140, with additional logical switches connected to these logical routers.

Each service router 132 and 135 also corresponds to one or more uplink ports of the logical router 105 for connecting to the external network 130 in some embodiments. Therefore, each of the service routers has a single north-facing interface (though, in other embodiments, a single SR can implement multiple uplink interfaces). The SRs of some embodiments are responsible for delivering services that are not implemented in a distributed fashion (e.g., some stateful services). Even if there are no stateful services configured on the logical router 105, some embodiments use SRs to centralize management of the connection(s) to the external network 130.

In some embodiments, the management plane generates separate routing information bases (RIBs) for each of the router constructs 132-140. Essentially, the network management and control system treats each of the router constructs 132-140 as a separate logical router with a separate routing table and separate interfaces.

Figure 2:
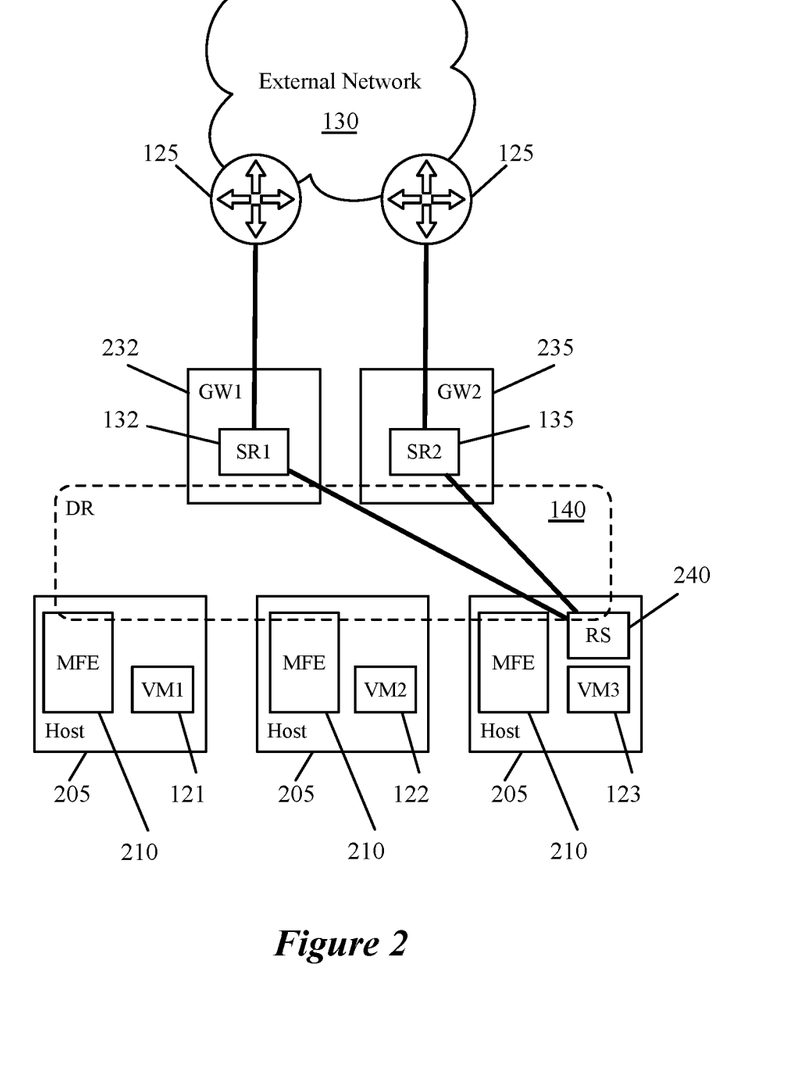
FIG. 2 conceptually illustrates a physical implementation of the logical network in FIG. 1.

FIG. 2 illustrates a physical implementation of the logical network 100 according to some embodiments. As shown, each of the VMs 121-123 that couples to one of the logical switches 110 and 115 in the logical network 100 resides on a particular host machine 205. In some embodiments, more than one VM may reside on any given host machine. Managed forwarding elements (MFEs) 210 that execute on these host machines in some embodiments are software virtual switches (e.g., Open vSwitch (OVS), ESX) that operate within hypervisors or other virtualization software (not shown) executing on the host machines. These MFEs 210 perform first-hop switching and routing to implement the logical switches 110 and 115, and the logical router 105, for packets sent by the VMs 121-123 of the logical network 100. As a result, the distributed routing component 140 is implemented across all the MFEs 210 implementing the logical network 100, represented as a dotted rectangle spanning the host machines in FIG. 2.

The MFEs 210 (or a subset of them) also may implement logical switches (and distributed logical routers) for other logical networks if the other logical networks include VMs or other data compute nodes that reside on the host machines 205 as well. In some embodiments, these other logical networks may be different tenants of a datacenter to which the host machines 210 belong.

The centralized routing components 132 and 135 each operate on different gateway machines 232 and 235. The gateway machines 232 and 235 are host machines similar to the machines 205, hosting centralized routing components rather than user VMs (in some embodiments, some host machines can host both centralized routing components and user VMs). In some embodiments, the gateway machines 232 and 235 each also include an MFE, in order to handle logical switching as well as routing for the distributed routing component 140. The distributed routing component 140 would then span the gateway machines 232 and 235 accordingly. For instance, packets sent from the external network 130 may be routed by an SR routing table on one of the gateway machines and then subsequently switched and routed (according to the distributed routing component routing table) by the MFE on the same gateway. In other embodiments, the gateway machines execute a datapath (e.g., a DPDK-based datapath) that implements one or more centralized routing components as well as other logical forwarding elements (e.g., logical switches, distributed routing components, etc.).

The centralized routing components 132 and 135 may also be implemented in a namespace, a virtual machine, or as a VRF in different embodiments. They may operate in an active-active or active-standby mode in some embodiments, depending on whether any stateful services (e.g., firewalls) are configured on the logical router 105. When stateful services are configured, some embodiments require only a single active SR. In some embodiments, the active and standby SRs are provided with the same configuration, but the MFEs 210 are configured to send packets via a tunnel to the active SR (or to the MFE on the gateway machine with the active SR). Only if the tunnel is down will the MFE send packets to the standby gateway.

In order for VMs in the logical network 100 to receive southbound data message traffic from the external network 130, the SRs 132 and 135 of some embodiments learn routes from the distributed routing component 140 of the logical router 105, which logically interfaces directly with the internal logical network via its south-facing interfaces. In some embodiments, each of the gateway hosts 232 and 235 also executes a routing protocol application (e.g., as a daemon), which receives routing protocol packets sent to the SR and processes these packets in order to modify the SR routing table. In such embodiments, operations attributed below to the SR (e.g., to process routing protocol messages or generate routing protocol messages in order to advertise routes) may instead be performed by the routing protocol application executing alongside the SR.

The SRs (i) advertise some of the routes from the distributed routing component 140 to the routers 125 in the external network and (ii) use these routes to route data messages received from the external network 130. Route advertisement from centralized routing components to external network routers is explained in further detail in U.S. Pat. Nos. 10,075,363, 10,038,628, and 9,590,901, which are incorporated herein by reference.

The SRs 132 and 135 also learn routes from the external network routers 125. In certain situations, the SRs 132 and 135 will learn routes for a public Internet Protocol prefix from the external routers 125 that is also used as an internal private subnet in the logical network 100 (in which case the SR would be configured to not advertise the route, but still should use the route for internal routing). However, in certain cases, the hierarchy of the routing protocol will cause the SR to prefer the route learned from the external router 125 to that learned from the DR 140. In some embodiments, the SRs 132 and 135 each use a local database to store information associated with each route, including the source from which the route was received.

Because the distributed routing component 140 is potentially implemented across numerous (e.g., dozens, hundreds, thousands, etc.) of physical host computers 205, in some embodiments a route server 240 (RS) is used to aggregate the routes of the distributed routing component and advertise these routes to the edge gateways. This route server may be implemented in some embodiments as a separate physical device, a virtual machine or other data compute node executing on a host computer (e.g., separately from data compute nodes that are the endpoints of the logical network), etc. For example, in FIG. 2 the route server 240 is shown as executing (e.g., as a VM) on one of the host machines 205 alongside VM3 123. In other embodiments, the route server is implemented by a network controller.

In order to ensure that the routes advertised by the route server 240 are preferred by the SRs 132 and 135 over routes received from the external routers 125, in some embodiments the route server sends two types of routing protocol messages to the SRs. The first routing protocol message of some embodiments includes (i) a parameter that identifies the machine 240 as a route server to the SRs and (ii) a set of addresses (prefixes) for the logical network 100 (e.g., subnets of the logical network). These addresses are the addresses for which routes are advertised to the SRs.

The second routing protocol message specifies a next hop address corresponding to the distributed routing component 140 (e.g., a north-facing interface of the DR that interfaces with the SRs, or in some embodiments via the corresponding interface of the transit logical switch 145), and the SR uses this next hop address as the next hop for the set of addresses sent in the first message. Because the first message identifies the source of these routes as a route server, the SRS can be configured to prefer these routes to routes learned from the external routers 125 when updating its routing table, while otherwise remaining compliant with the routing protocol. Thus, for data messages addressed to end machines in the logical network, the SR routing table will correctly route the messages to the distributed routing component 140 (which may be implemented by a different routing table on the same computing device). For data messages addressed to other addresses not in the logical network (e.g., external addresses), the SRs 132 and 135 will still route these data messages to the external routers 125 in accordance with the default routing protocol hierarchy.

Figure 3:
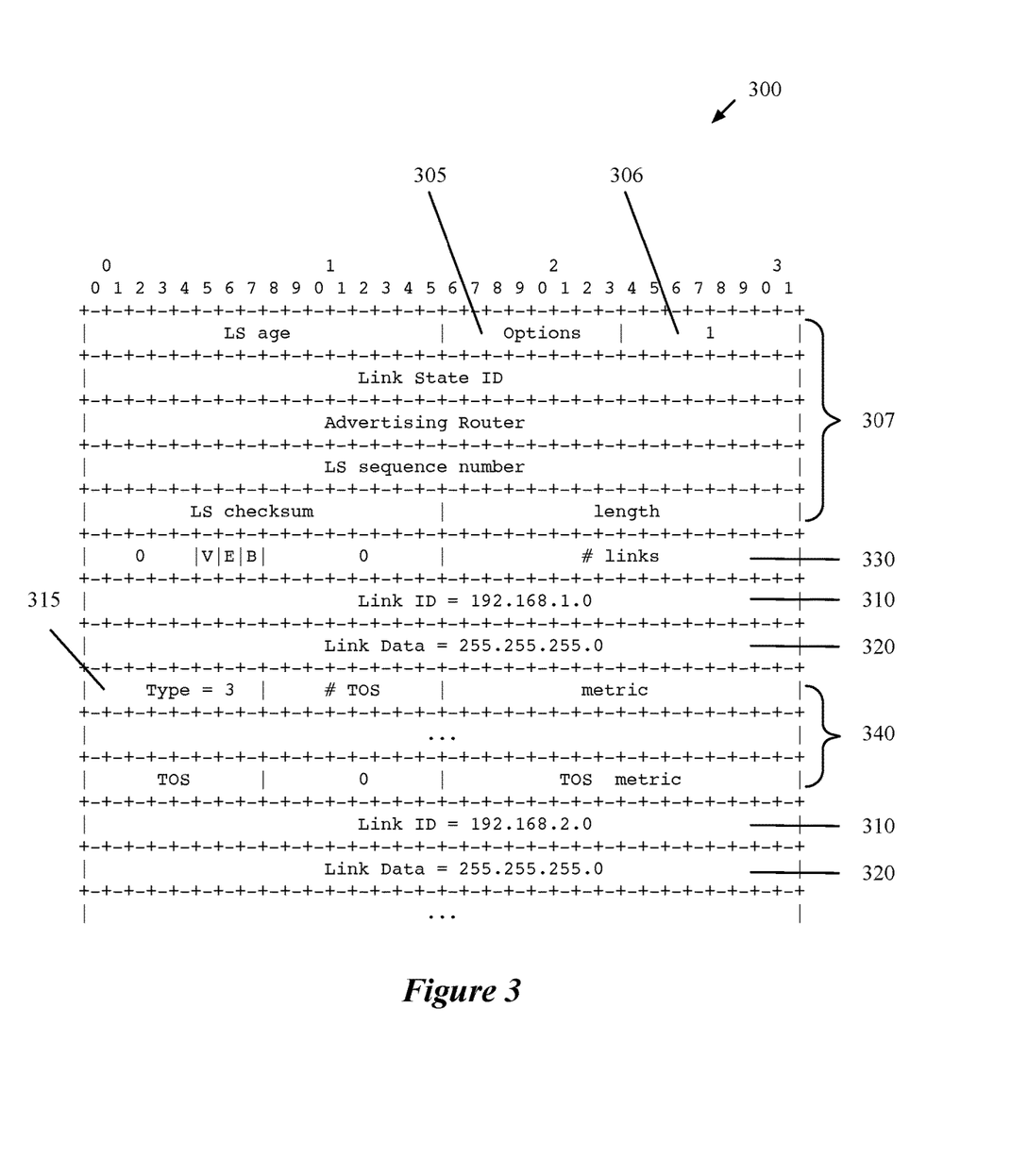
FIG. 3 illustrates an example of a router link state advertisement (LSA) received by an edge gateway.

One hierarchical routing protocol used in some embodiments is Open Shortest Path First (OSPF). In this case, the first routing protocol message is a type 1 Link State Advertisement (LSA), also known as a router LSA. FIG. 3 illustrates an example of such a router LSA 300 received by the edge gateway 132 (i.e., SR1). The router LSA includes an options field 305 and an LSA type field 306 in the header 307. The LSA type field 306 has a value of 1, indicating that this is a type 1 (router) LSA according to the OSPF protocol. After the header 307, the router LSA contains a succession of "Link ID" 310 and "Link Data" 320 fields that each contain an address for advertisement to the edge gateways.

Figure 4:
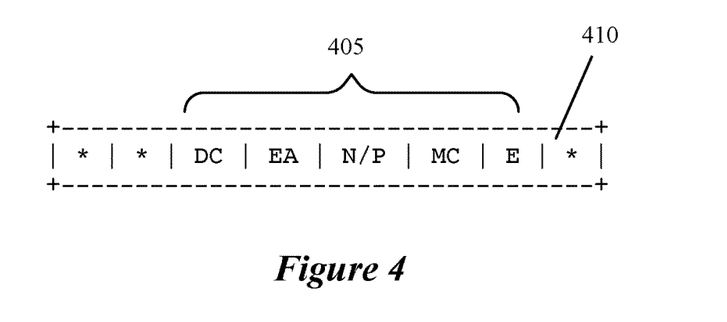
FIG. 4 illustrates the Options field in the header of the LSA of FIG. 3.

The options field is expanded for purposes of illustration in FIG. 4. The purpose of the options field is to enable optional capabilities that extend the OSPF protocol. The options field is eight bits long, of which five bits 405 have been assigned by the OSPF protocol. Three bits are unassigned, represented by asterisks (*). These unassigned bits can be used for proprietary purposes, since routers adhering to the OSPF protocol simply ignore any unrecognized bits and process the LSA normally. The parameter 410 that identifies the route server 240 is the last bit in some embodiments, referred to as the route server bit.

Returning to the router LSA example in FIG. 3, the total number of addresses is tallied in the "# links" field 330 (note that addresses are referred to as links in OSPF terminology). Each link also has a unique identifier in the Link ID field 310, which varies by the type of link, as specified in the "Type" field 315. For example, if the link type is type 3, which is a connection to a subnet of the logical network (a "stub network"), then the link ID is the network/subnet number (e.g. 192.168.1.0).

The link data field 320 associated with a given link ID also varies by the type of link. For the link type of a stub network, the corresponding link data is the IP address mask (e.g. 255.255.255.0). Additional fields 340 follow, some of which are used by the OSPF algorithm to calculate the optimal path with the shortest cost. After these additional fields, the next link is described with its own link ID, link data, etc.

Figure 5:
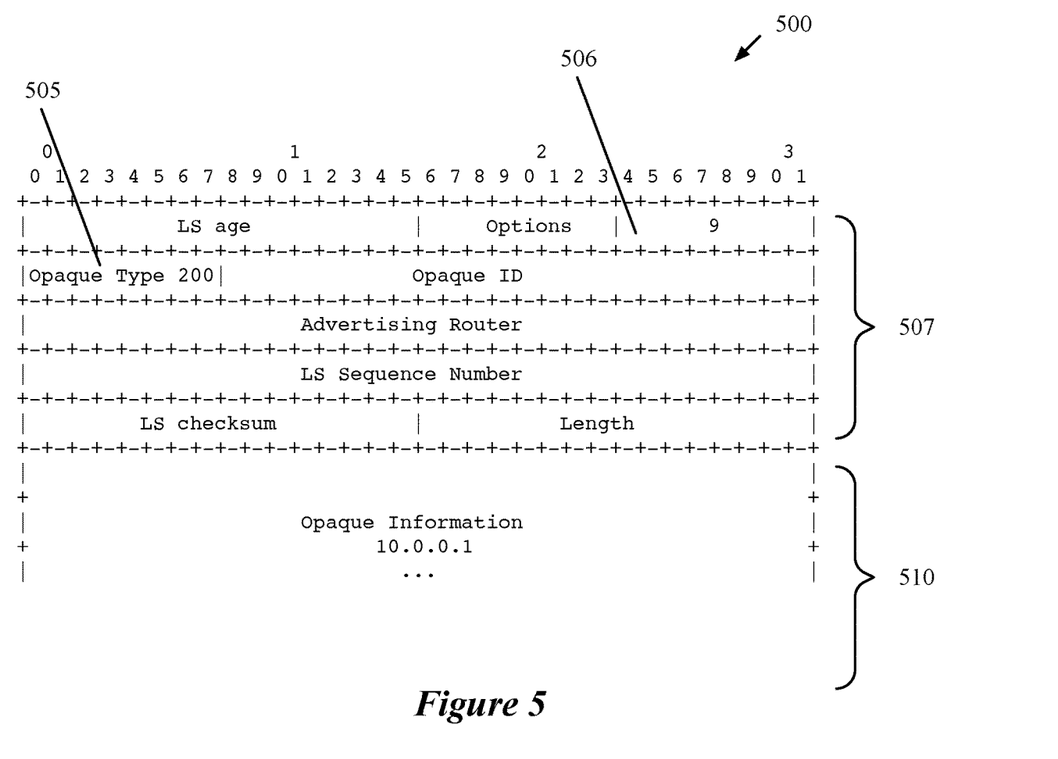
FIG. 5 illustrates an example of an opaque LSA received by the edge gateway.

In embodiments using the OSPF protocol, the second routing protocol message is a type 9 LSA, also known as an "opaque LSA," which enables extending the OSPF protocol. FIG. 5 illustrates an example of such an opaque LSA 500. The opaque LSA includes an "Opaque Type" field 505 and an LSA type field 506 in the header 507. The LSA type field 506 has a value of 9, indicating that this is a type 9 (opaque) LSA according to the OSPF protocol. After the header 507, the opaque LSA contains an "Opaque Information" field 510.

The opaque type field 505 specifies a value that allows the edge gateways 132 and 135 to interpret the opaque LSA 500. Values 1-4 are assigned to various OSPF protocol extensions, values 5-127 are unassigned, and values 128-255 are reserved for private (e.g., proprietary) use. For example, in some embodiments, the opaque type value used is 200. The use of an opaque type acts as a filter to reject opaque LSAs from other sources that are not route servers, but which may have also set the same options bit in their router LSAs. It is unlikely that a foreign router would have the same options bit set in its router LSA and the same opaque type in its opaque LSA. The opaque type can therefore be considered a validation of the route server. Opaque LSAs received from a source that is considered a route server due to the options bit, but which have the incorrect opaque type, may be simply ignored.

The opaque information field 510 is used to specify the specific data relevant to the opaque LSA from the validated route server. In this case, the information is the next hop address to be used for all the link addresses in the router LSA. In this example, the next hop for both subnets linked in the router LSA is the private IP address (10.0.0.1) of the north-facing interface to transit logical switch 145 from SR1 132.

It should be noted that, as used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples above and below refer to data packets, packets, data messages, or messages, it should be understood that the invention should not be limited to any specific format or type of data message.

Figure 6:
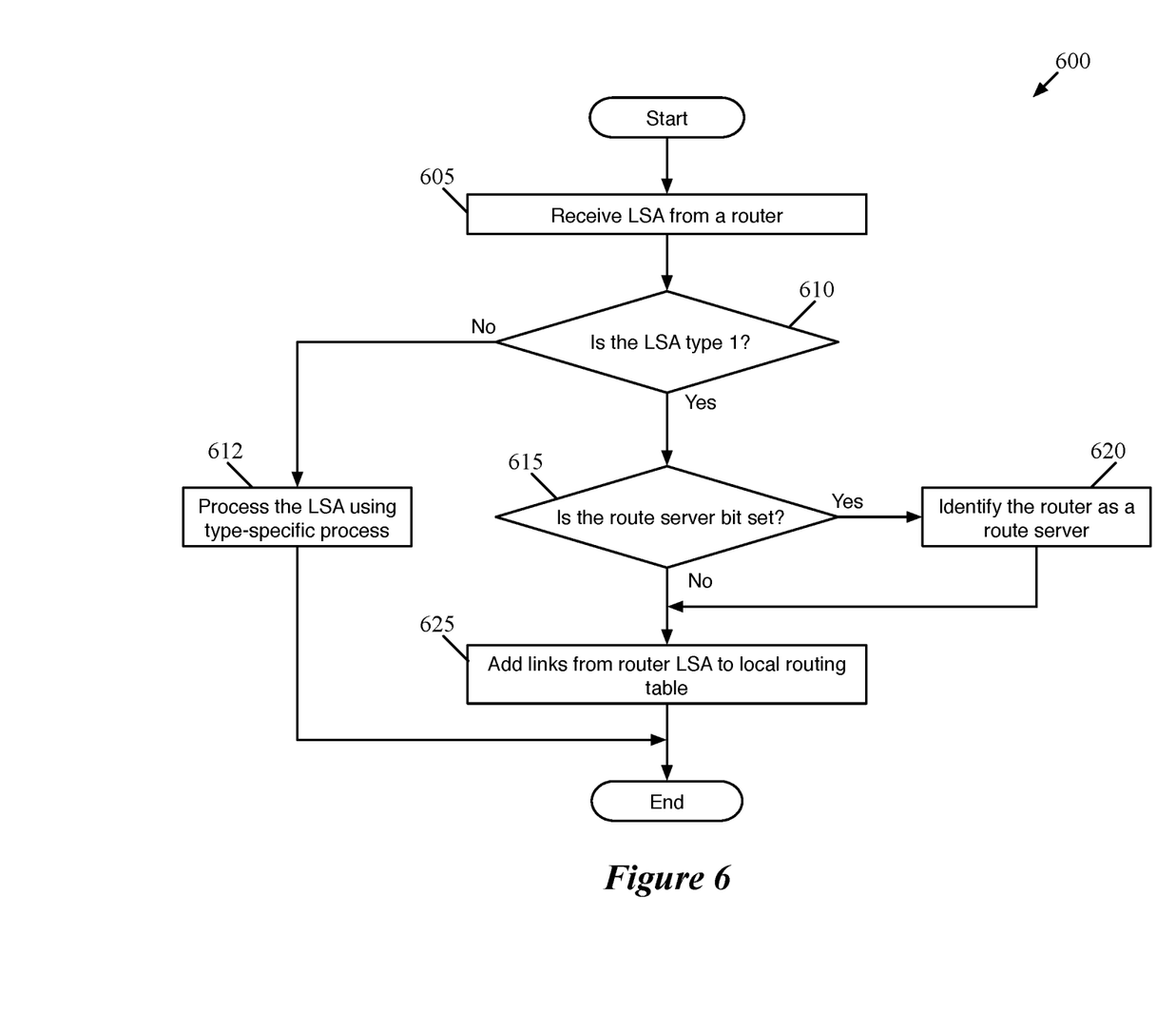
FIG. 6 conceptually illustrates a process performed by the edge gateway in some embodiments to process a router LSA.

FIG. 6 conceptually illustrates a process 600 of some embodiments to process a router LSA. In some embodiments, the process 600 is performed by a centralized routing component of a logical network, to handle a router LSA received from a route server for a distributed routing component of the logical network. The process 600 begins by receiving (at 605) an LSA from a source router. The source router may be an external router, a logical routing component (such as the DR 140), a route server (e.g., a route server for a logical routing component), or any other type of router neighboring the SR under the OSPF protocol.

After receiving the LSA, the process 600 determines (at 610) the type of LSA from the LSA type field in the LSA header (e.g., the type field 306 shown in FIG. 3). For a router LSA, the value of the router type field should be 1. Other LSA types of the OSPF protocol include type 2 (network LSA), types 3 and 4 (Summary LSAs), type 5 (external LSA), type 6 (multicast LSA), type 7 (NSSA LSA), type 8 (link-local LSA), and types 9-11 (opaque LSAs). If the LSA is not a router LSA, the process 600 processes (at 612) the LSA according to the LSA type specified in the type field, then ends.

On the other hand, if the LSA is a router LSA (i.e., type 1), the process 600 determines (at 615) whether the route server bit of the router LSA has been set to identify the source of the LSA as a route server (i.e., whether the route server flag is set to 1). As shown in FIGS. 3 and 4, the route server bit is the last bit in the options field of the router LSA header in some embodiments. In other embodiments, other bits (or groups of bits) are set to identify the source of an LSA as a route server.

If the route server bit has been set, then the process 600 identifies (at 620) the source router as a route server. In some embodiments, the process 600 stores the identification of the route server in an internal database, for reference when it receives an opaque LSA as discussed below. If the route server bit has not been set, then the process 600 does not identify the source router as a route server.

Next, the process 600 adds (at 625) the links specified in the router LSA to the local routing table (e.g., to the routing table for the centralized routing component). The forwarding address for each link is determined according to the default OSPF protocol hierarchy. If the centralized routing component that receives the router LSA has not yet received any opaque LSAs, the centralized routing component processes the links in the router LSA received from the route server just as it processes links received from another router (e.g., an external router). The process 600 then ends.

Figure 7:
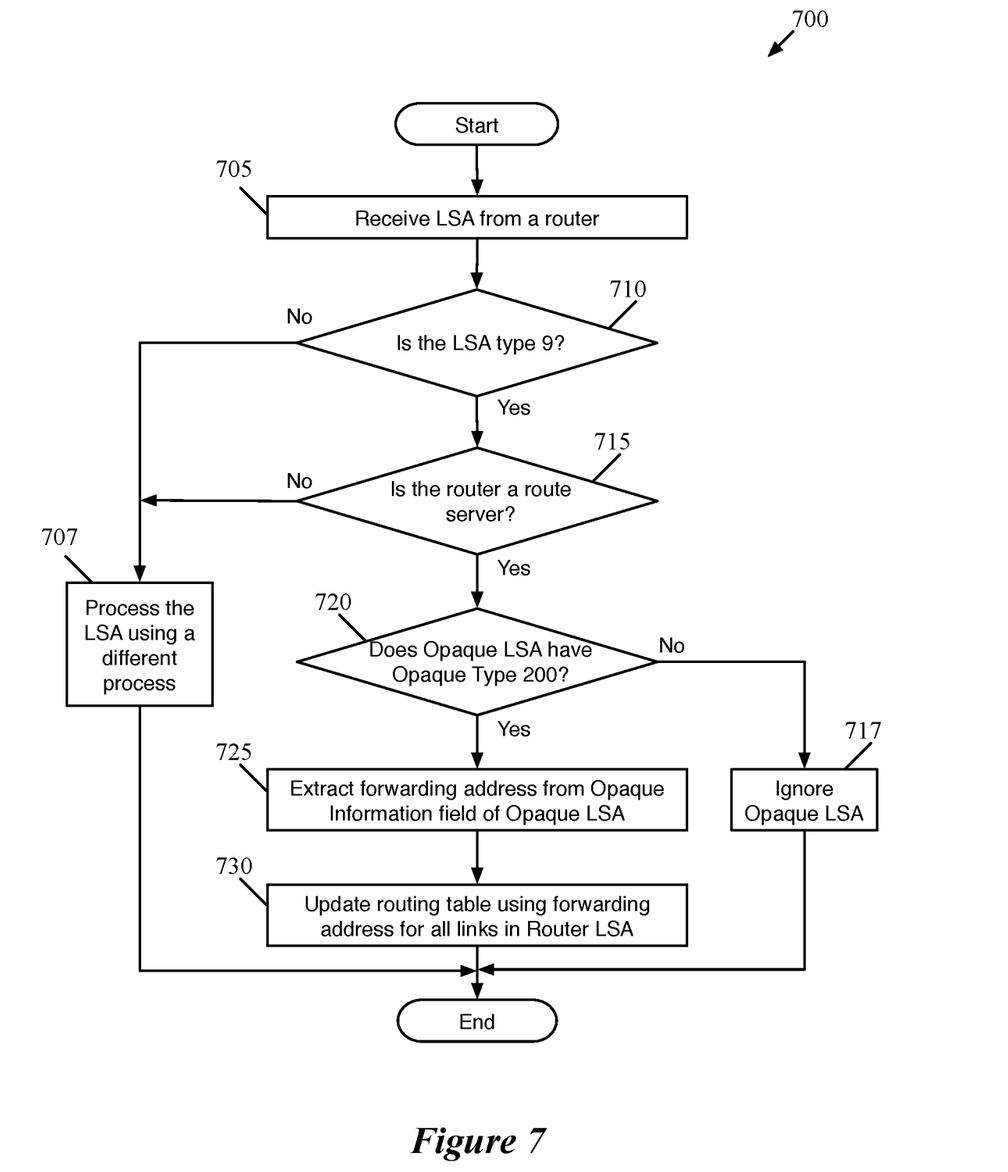
FIG. 7 conceptually illustrates a process performed by the edge gateway in some embodiments to process an opaque LSA.

FIG. 7 conceptually illustrates a process 700 of some embodiments to process an opaque LSA. In some embodiments, the process 700 is performed by a centralized routing component of a logical network, to handle an opaque LSA received from a route server for a distributed routing component of the logical network.

The process begins by receiving (at 705) an LSA from a source router. The source router may be an external router, a logical routing component (such as the DR 140), a route server (e.g. a route server for a logical routing component), or any other type of router neighboring the SR under the OSPF protocol.

After receiving the LSA, the process 700 determines (at 710) the type of LSA from the LSA type field in the LSA header (e.g. the type field 506 in the sample opaque LSA illustrated in FIG. 5). For an opaque LSA in OSPF, the value of the router type field should be 9. If the LSA is not an opaque LSA, the process 700 processes (at 707) the LSA according to the LSA type specified in the type field, then ends. For example, if the LSA is a router LSA, then the edge gateway processes the LSA as shown in FIG. 6.

On the other hand, if the LSA is an opaque LSA, the process determines (at 715) whether the source router is a route server. The SR makes this determination in some embodiments by checking if the source router is identified as a route server in an internal database. For example, the source router would be designated as a route server if the SR previously received a router LSA from the route server with the route server bit set, (e.g., as described above in reference to 615 in FIG. 6).

If the router is not a route server, the process 700 processes (at 707) the opaque LSA using a different process. For example, the SR may be configured to process opaque LSAs which extend the OSPF protocol in other ways which are unrelated to the route server. The process 700 then ends.

On the other hand, if the router is a route server, then the process 700 determines (at 720) whether the opaque LSA is the correct opaque type. The opaque LSA type is determined in some embodiments by looking at the opaque type field of the opaque type LSA. For example, in the sample opaque LSA of FIG. 5, the correct opaque type is predefined in the opaque type field 505 as opaque type 200.

It should be noted that the opaque type is different from the LSA type. The value for the opaque type field, only present in an opaque LSA (e.g. as illustrated in FIG. 5), can range from 1 to 255. According to the OSPF protocol, opaque types 1-127 are reserved for various applications by consensus of the Internet Engineering Task Force (IETF), with types 5-127 unassigned. Opaque types 128-255 are set aside for private use, such as proprietary extensions to the OSPF protocol. If the opaque LSA is not the correct opaque type, then the process 700 ignores (at 717) the opaque LSA.

In some embodiments, the receipt of an opaque LSA from a route server that is the wrong opaque type occurs when the source router is not actually a route server, even though a previous LSA had been received from the router with the route server bit set. The source router may instead be using the same bit to implement a different feature that is not supported by the SR. Since all routers in an OSPF area receive all LSAs broadcast within the area, in some cases an SR will receive LSAs that were not intended for its consumption (e.g., from external routers). These other routers might also send opaque LSAs with a different opaque type that would be recognized by the intended target of the LSA, but not by the SR. Because the opaque LSA is not the correct type for the SR, the LSA can be safely ignored in compliance with the OSPF protocol. The process 700 then ends.

If the opaque LSA is the correct opaque type, then the SR knows that it is the intended recipient and knows how to interpret the data within the opaque LSA. The process 700 accordingly extracts (at 725) the forwarding address from the opaque information field of the opaque LSA (e.g., field 510 in the sample opaque LSA 500 in FIG. 5).

Finally, the process then updates (at 730) the routing table of the SR with the extracted forwarding address for all the links specified in the router LSA received previously from the route server (e.g., as described above with reference to FIG. 6). The process will not update the forwarding address for links specified in router LSAs received from other routers, such as external routers. In some embodiments, the SR stores information associated with each route, such as what source the route was learned from, in an internal database. In such embodiments, the SR would consult that database to determine which routes were learned from the route server and update only those routes with the forwarding address specified in the opaque LSA. The process 700 then ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
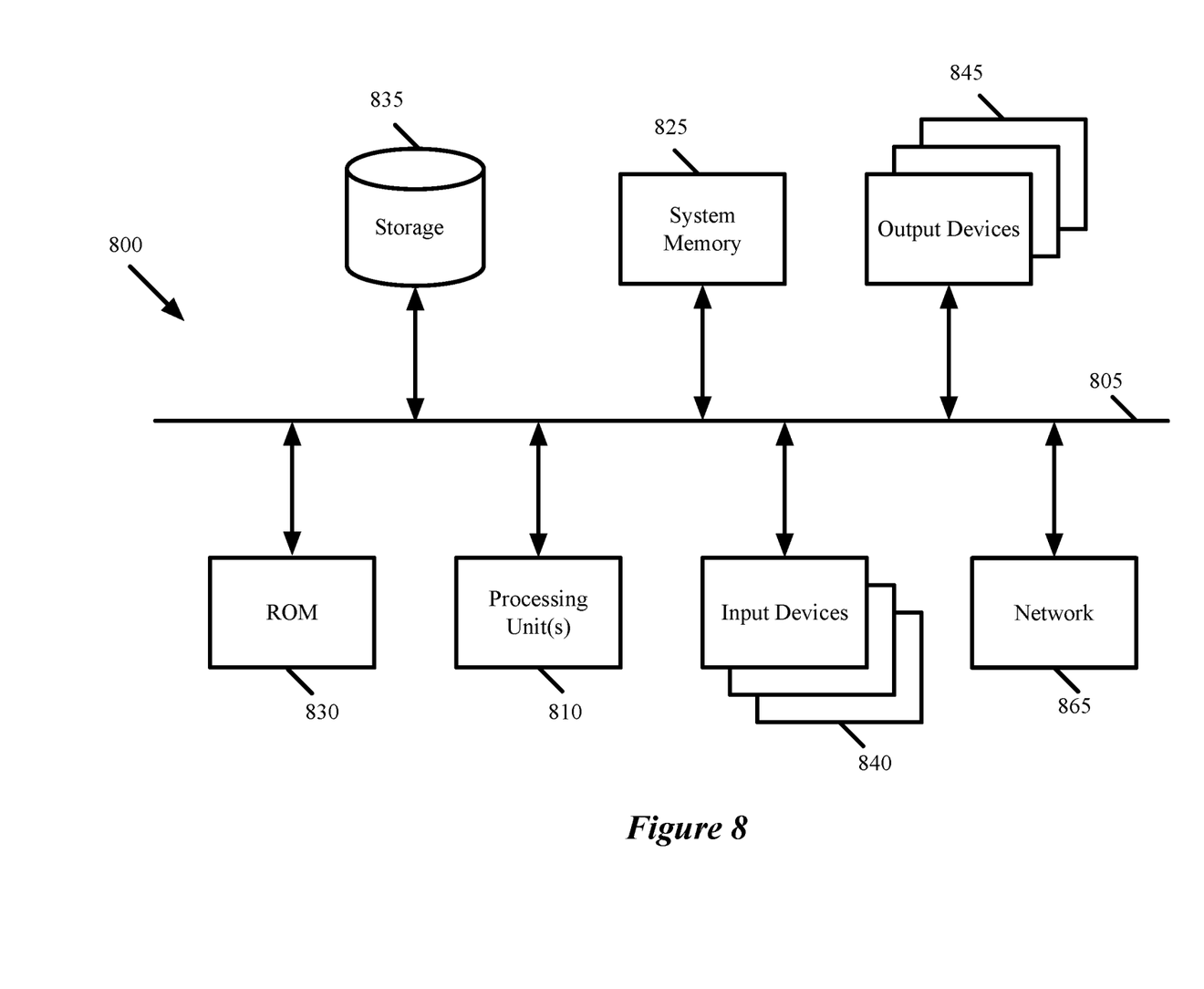
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such as random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a computing device that implements a centralized logical routing component of a logical network that handles data traffic between the logical network and an external physical network, a method comprising:

receiving a first link state advertisement (LSA) message from a machine that implements a route server for a distributed logical routing component of the logical network, the distributed logical routing component implemented across a plurality of physical forwarding elements, the first LSA message comprising (i) a parameter identifying the machine as a route server and (ii) a set of logical network addresses;

receiving a second LSA message from the route server that specifies a next hop address for the set of logical network addresses, wherein the next hop address corresponds to the distributed logical routing component; and adding a route specifying the next hop address corresponding to the distributed logical routing component as the next hop address for the set of logical network addresses to a routing table of the centralized logical routing component, wherein the added route has a higher priority than routes received from the external physical network.

2. The method of claim 1 further comprising:

receiving a data message addressed to an end machine in the logical network; and routing the data message based on the added route in the routing table.

3. The method of claim 2, wherein the data message is received from a router in the external physical network.

4. The method of claim 2, wherein routing the data message based on the added route in the routing table comprises:
   performing a first logical processing operation on the data message for the centralized routing component to identify the next hop address as a next hop for the data message; and
   performing a second logical network processing operation on the data message for the distributed logical routing component.

5. The method of claim 4, wherein the plurality of physical forwarding elements that implement the distributed logical routing component comprises the computing device and a plurality of additional computing devices.

6. The method of claim 1, wherein the centralized routing component is one of a plurality of centralized routing components that are each implemented by a different single computing device, wherein the plurality of centralized routing components and the distributed logical routing component are components of a same logical router of the logical network.

7. The method of claim 1, wherein the first and second LSAs are Open Shortest Path First (OSPF) routing protocol messages.

8. The method of claim 7, wherein the first LSA is a type 1 LSA comprising a header, wherein the parameter that identifies the machine as a route server is a single bit in an options field of the header.

9. The method of claim 8, wherein the second LSA is a type 9 LSA comprising a header and an opaque information field, wherein the next hop address is specified in the opaque information field.

10. The method of claim 9, wherein the header comprises an opaque type field, wherein the opaque type field identifies the second LSA as opaque type 200.

11. A non-transitory machine readable medium storing a program which when executed by at least one processing unit implements a centralized logical routing component of a logical network that handles data traffic between the logical network and an external physical network, the program comprising sets of instructions for:
   receiving a first link state advertisement (LSA) message from a machine that implements a route server for a distributed logical routing component of the logical network, the distributed logical routing component implemented across a plurality of physical forwarding elements, the first LSA message comprising (i) a parameter identifying the machine as a route server and (ii) a set of logical network addresses;
   receiving a second LSA message from the route server that specifies a next hop address for the set of logical network addresses, wherein the next hop address corresponds to the distributed logical routing component; and
   adding a route specifying the next hop address corresponding to the distributed logical routing component as the next hop address for the set of logical network addresses to a routing table of the centralized logical routing component, wherein the added route has a higher priority than routes received from the external physical network.

12. The non-transitory machine readable medium of claim 11, wherein the program further comprises sets of instructions for:
   receiving a data message addressed to an end machine in the logical network; and
   routing the data message based on the added route in the routing table.

13. The non-transitory machine readable medium of claim 12, wherein the data message is received from a router in the external physical network.

14. The non-transitory machine readable medium of claim 12, wherein the set of instructions for routing the data message based on the added route in the routing table comprises sets of instructions for:
   performing a first logical processing operation on the data message for the centralized routing component to identify the next hop address as a next hop for the data message; and
   performing a second logical network processing operation on the data message for the distributed logical routing component.

15. The non-transitory machine readable medium of claim 14, wherein the plurality of physical forwarding elements that implement the distributed logical routine component comprises the computing device and a plurality of additional computing devices.

16. The non-transitory machine readable medium of claim 11, wherein the centralized routing component is one of a plurality of centralized routing components that are each implemented by a different single computing device, wherein the plurality of centralized routing components and the distributed logical routing component are components of a same logical router of the logical network.

17. The non-transitory machine readable medium of claim 11, wherein the first and second LSAs are Open Shortest Path First (OSPF) routing protocol messages.

18. The non-transitory machine readable medium of claim 17, wherein the first LSA is a type 1 LSA comprising a header, wherein the parameter that identifies the machine as a route server is a single bit in an options field of the header.

19. The non-transitory machine readable medium of claim 18, wherein the second LSA is a type 9 LSA comprising a header and an opaque information field, wherein the next hop address is specified in the opaque information field.

20. The non-transitory machine readable medium of claim 19, wherein the header comprises an opaque type field, wherein the opaque type field identifies the second LSA as opaque type 200.

* * * * *